(No Model.)  2 Sheets—Sheet 1.

W. L. PRICE.
ROLLING APPARATUS.

No. 384,591.  Patented June 12, 1888.

WITNESSES.
J. Daniel Eby.
Van Wyck Budd.

INVENTOR.
Wm. L. Price.
by _____ Attorney.

(No Model.)　　　　　　W. L. PRICE.　　　2 Sheets—Sheet 2.
ROLLING APPARATUS.

No. 384,591.　　　　　　Patented June 12, 1888.

Witnesses:
J. Daniel Eby.
Van Wyck Budd.

Inventor.
Wm. L. Price.

per Henry Wigand, Atty.

N. PETERS, Photo-Lithographer, Washington, D. C.

UNITED STATES PATENT OFFICE.

WILLIAM L. PRICE, OF PHILADELPHIA, PENNSYLVANIA.

ROLLING APPARATUS.

SPECIFICATION forming part of Letters Patent No. 384,591, dated June 12, 1888.

Application filed October 17, 1887. Serial No. 252,619. (No model.)

*To all whom it may concern:*

Be it known that I, WILLIAM L. PRICE, a citizen of the United States, residing at Philadelphia, in the county of Philadelphia and State of Pennsylvania, have invented certain new and useful Improvements in the Method of and Apparatus for Rolling and Swaging Metal; and I do hereby declare the following to be a sufficiently full, clear, and exact description thereof to enable others skilled in the art to make and use the said invention.

This invention relates to the method of and apparatus for swaging forms of metal in dies formed in or inserted in rolls, and has for its object the cheap and expeditious production of metallic articles having differing forms of cross-section in different parts of their length and of greater length than the circumference of practicable diameters for convenient or useful operation.

To effect this result, this invention consists in arranging the opposing dies or cavities in the rolls in a helical direction, so that the bars or other articles as they are passed between the rolls and are swaged move in the direction of the length of the roll.

The invention also embraces some minor details for adjusting the dies or rolls to different dimensions of work, as shown in the annexed drawings, and hereinafter described and claimed.

Figure 1:
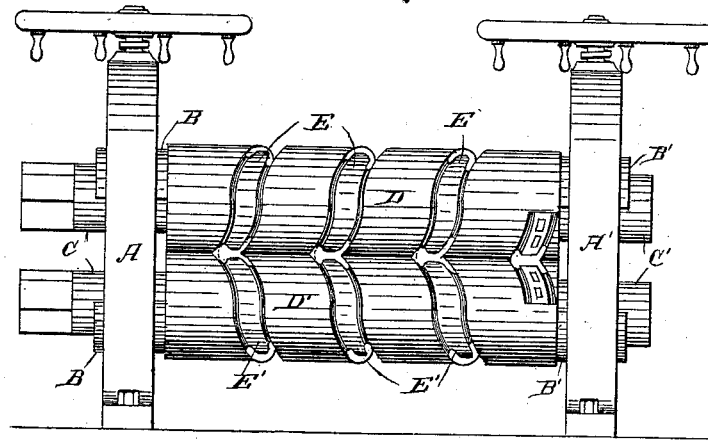
Figure 2:
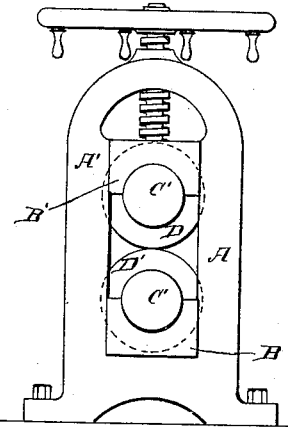
Figure 3:
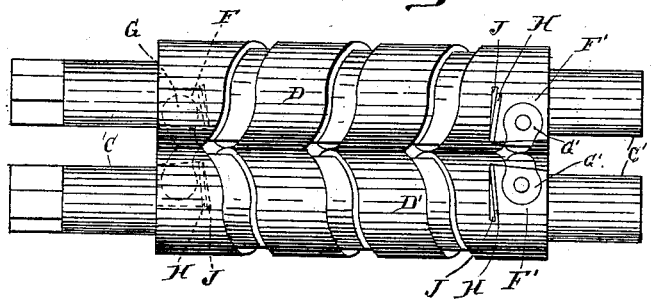
Figure 4:
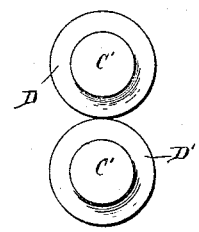
Figure 5:
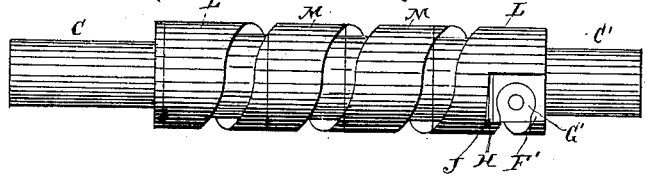
Figure 6:
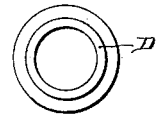
Figure 7:
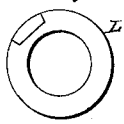
Figure 8:
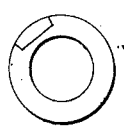
Figure 9:
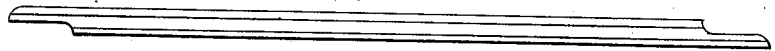
Figure 9:
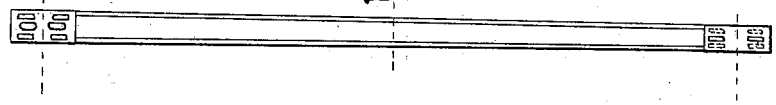
Figure 9:
Figure 9:
Figure 9:
Figure 10:
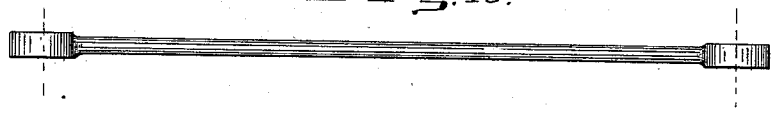
Figure 10:
Figure 10:
Figure 10:
Figure 10:

Referring to the drawings, Figure 1 shows a front elevation of a pair of rolls embodying this invention. Fig. 2 shows a side or end elevation thereof. Fig. 3 shows a front elevation of a modified form thereof. Fig. 4 shows an end view of the rolls shown in Fig. 3. Fig. 5 shows another modification in the form of the roll. Figs. 6, 7, and 8 show separately the parts of the roll shown in Fig. 5, and Figs. 9 and 9$^a$, respectively, show top and side views of the work produced in the rolls shown in Fig. 1, and Figs. 9$^b$ and 9$^d$ sections of such work near the ends, and Fig. 9$^c$ a section near the mid-length thereof. Figs. 10 and 10$^a$, respectively, show edge and side views of the work produced by the rolls shown in Fig. 3, and Figs. 10$^b$ and 10$^d$ sections of such work near the ends, and Fig. 10$^c$ a section near the mid-length thereof.

The same letters and ordinals indicate the same parts in the several figures.

A and A' are the housings or frames supporting the bearings B and B', in which the journals C and C' of the rolls D and D' turn.

In the rolls shown in Figs. 1 and 2 grooves or cavities E and E', conforming to the shape of the intended metallic articles, are excavated in a helical direction, the helice E in the upper roll, D, being in the direction of a right screw-thread, and the helical groove E' in the lower roll, D', in the direction of a left screw-thread. The helical grooves or cavities E and E' should be of equal pitch, so that throughout the rotation of both rolls at equal velocities the grooves E and E' shall match or coincide in their margins at the line of contact with each other.

In operation the rolls D and D' are rotated continuously by gearing, in the usual manner, as indicated by the arrows marked on them. The bar of ductile metal to be shaped is reduced approximately to the dimensions which it should have when finished, and is presented to the rolls in a line oblique to the plane of the axes of the rolls D and D' in a tangential direction to the helical grooves E and E' near the right end of the rolls, and, entering the grooves E and E', is swaged by the rolls into the continued form of the cavities E and E', moving during the operation toward the left end of the rolls, whence it is discharged. The shape of the cavities E and E' in the rolls D and D' (shown in Fig. 1) produces the railway bar or rail having spliced ends for uniting it with other similar bars or rails.

Referring to Figs. 3 and 4, the rolls D and D' are made with cavities or recesses F and F', into which are inserted removable dies G and G', which arrangement furnishes a means of adjusting to varying requirements of dimensions and forms of work, and for corrections and compensations for wear without incurring the cost of additional rolls and the labor of removing and replacing them.

The form of the cavities E and E' in the dies G and G' and rolls D and D' (shown in Figs. 3 and 4) produce the link or eye-bar shown in Fig. 10. The mode of operating this form of rolls is similar to that described in referring to Figs. 1 and 2, the only difference being that the dies are inserted removably, and, by means of liners or packings H and keys J, are adjustable.

Referring to Fig. 5, the roll D is made of parts, consisting of a center or body (shown separately in Fig. 6) and removable rings or zones L and M, in which the helical grooves or swages E and E' are cut, so that when assembled they form the entire swaging-die, of greater or less length, according to the number of zones or rings employed. One of the terminal zones, L, is shown separately in Fig. 7, and one of the intermediate zones, M, is shown in Fig. 8. When the parts are assembled, these rolls are operated as those previously described.

Having described this invention and the mode of operating the same, what I claim is—

1. The improved method of swage-rolling metallic shapes by passing such articles between rolls diagonally to the plane of their axes into helical swages formed in said rolls, substantially as set forth.

2. The improved rolling-swages, consisting of rolls fitted in pairs, with opposing helical swages formed therein, substantially as set forth.

3. The improved swaging-rolls, consisting of a pair of opposing rolls provided with helical opposing recesses formed therein, and cavities at the terminations of said helical recesses adapted to receive removable and adjustable dies, substantially as set forth.

4. Helical swaging-rolls, consisting of a central body or shaft, and removable zones having helical dies or grooves formed therein and arranged to form when assembled dies for varying lengths of work, substantially as set forth.

WILLIAM L. PRICE.

Witnesses:
S. B. CARR,
EMMA WEBB.